Jan. 19, 1971    R. DORRENBERG    3,555,935
METHOD OF PRODUCING DRILLS AND SIMILAR TOOLS, AND
TOOLS, ESPECIALLY DRILLS, MADE ACCORDING
TO SAID METHOD
Filed May 7, 1968    2 Sheets-Sheet 1
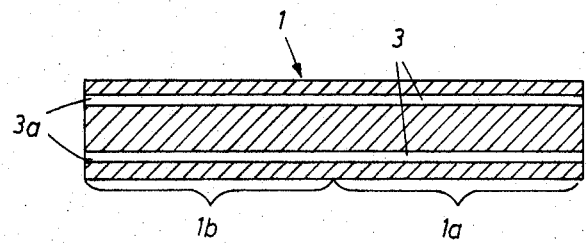
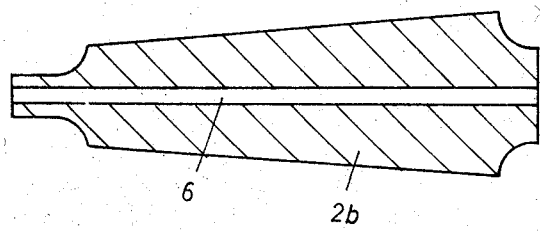
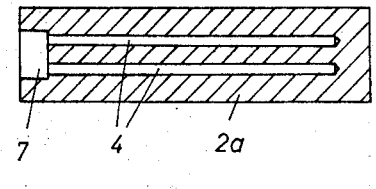
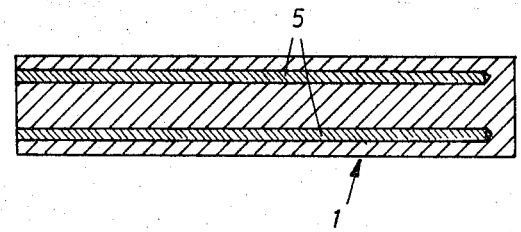
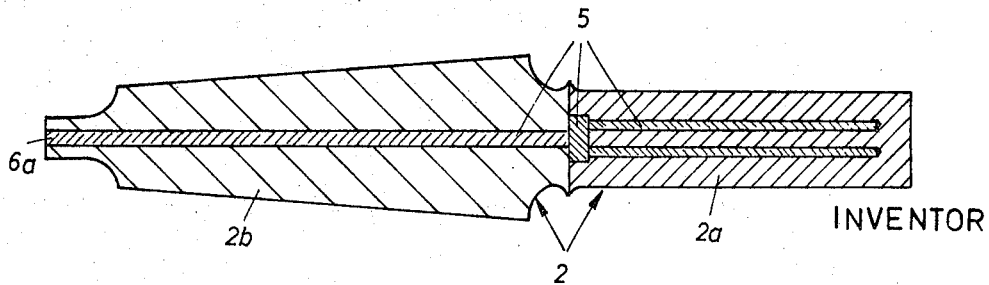
INVENTOR
Richard Dörrenberg INVENTOR
Richard Dörrenberg

United States Patent Office 3,555,935
Patented Jan. 19, 1971

3,555,935
METHOD OF PRODUCING DRILLS AND SIMILAR TOOLS, AND TOOLS, ESPECIALLY DRILLS, MADE ACCORDING TO SAID METHOD
Richard Dorrenberg, Dusseldorf-Oberkassel, Germany, assignor to Rohde & Dorrenberg, Dusseldorf-Oberkassel, Germany
Filed May 7, 1968, Ser. No. 727,148
Claims priority, application Germany, May 9, 1967, R 45,966
Int. Cl. B21k 5/02
U.S. Cl. 76—108
12 Claims

ABSTRACT OF THE DISCLOSURE

A method of producing tools, especially drills, with straight or twisted grooves or flutes according to which the raw tool is provided with at least one longitudinal passage means in that section of the tool which is to become the cutting section, said longitudinal passage means being filled with filling material having a melting temperature above the deforming temperature but less than the hardening temperature of the raw material from which the tool is made. The cutting section of the raw tool is subsequently heated to deforming temperature and the approximate cross-section of the finished tool is produced in a chipless manner by rolling or extrusion pressing. Finally, the filling material is melted and removed from the longitudinal passage means whereupon the tool is finish machined. The invention also covers a tool composed of two sections welded together and produced in the above manner.

---

The present invention concerns a method of producing drills with interior fluid feeding passages, or similar tools provided with helical grooves or straight grooves. The invention also concerns tools, especially drills, made according to the method of the present invention. Tools with helical grooves or straight grooves and equipped with passages for conveying fluid are known. Also various methods for producing such passages are known.

According to one of the heretofore known methods of producing drills with fluid conveying passages, the tool ingot is at a certain distance from the longitudinal axis of the ingot provided with bores which subsequently are filled with rods or wires of metal, preferably manganese hard steel. The thus prepared ingots are rectilinearly rolled at a deforming temperature while the ingot and bore cross-section are proportionally decreased. After thus axially lengthening the ingot, the metal fillings in the bores are in one instance bored out under considerable difficulties due to the great bore depth and the small diameter. In another instance, the wires of manganese hard steel are by applying a considerable force pulled out of the bores. After the bores have thus been freed, helically grooved tools are produced by providing the raw tools by milling or similar chip removing methods with longitudinally extending straight flutes symmetrically arranged with regard to the produced interior fluid conveying passages. Thereupon the raw tools are during a further operation at the respective deforming temperature twisted at the desired twisting angle.

In spite of the obvious advantages of tools provided with fluid passages, such tools have been adopted in practice only to a limited extent because they are rather expensive in view of the cumbersome production method and the expensive material.

It is, therefore, an object of the present invention to provide a method which will make it possible to produce tools with an interior fluid conveying passage, especially drills, in a simple and inexpensive manner while employing the heretofore known chipless shaping method.

It is another object of this invention to provide a method as set forth in the preceding paragraph, which will not require complicated and expensive operations for producing the bores for the fluid conveying passages and for freeing said bores.

It is also an object of this invention to produce tools with interior fluid conveying passage means which will be relative inexpensive.

These and other objects and advantages of the invention will appear more clearly from the following specification in connection with the accompanying drawings, in which:

FIG. 1 illustrates a longitudinal section through a raw tool from which a solid steel tool is to be made.

FIG. 2 is a longitudinal section through a shank portion of a raw tool composed of two sections welded together.

FIG. 3 illustrates a longitudinal section through the cutting portion of a raw tool composed of two sections welded together.

FIG. 4 is a longitudinal section through the raw tool of FIG. 1 filled with filling material in which the bores, in contradistinction to the bores of FIG. 1, are designed as blind bores.

FIG. 5 is a longitudinal section through the shank and cutting section according to FIGS. 2 and 3 in welded together condition and filled with filling material.

Figure 6:
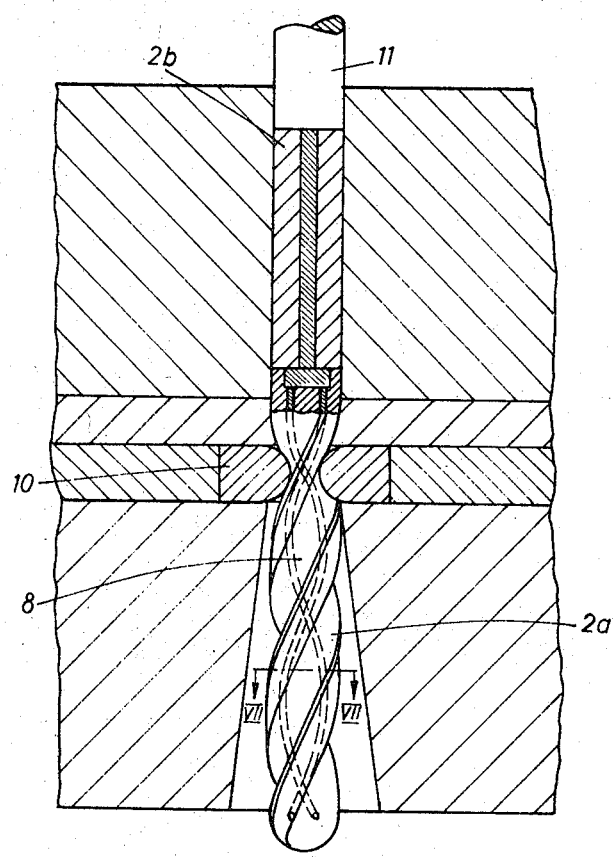
FIG. 6 represents a vertical section through a diagrammatically illustrated device for extrusion molding with the raw tool shown therein.

The method according to the present invention of making drills with interior fluid conveying passages or similar tools with helical grooves or straight grooves is characterized primarily by providing the raw tool with at least one longitudinal bore which will extend through at least what will later be the cutting section, filling the said bore with a filling material the melting temperature of which is higher than the deforming temperature and lower than the hardening temperature of the material of said raw tool, whereupon the cutting section of the raw tool is heated to deforming temperature and the cross-section of the tool and, as the case may be, the twist of the flutes and thereby the twist of the longitudinal bore is produced in a chipless manner by rolling or extrusion molding, and subsequently melting the filling material, preferably during the hardening operation, in the longitudinal bore and removing the same therefrom whereupon the tool is finish machined in customary manner. With the method according to the present invention, the raw tool may be composed of a cutting section and a shank section welded together which sections, prior to or after being welded together are provided with at least one longitudinal bore. The longitudinal bores in the shank section when arranged in pairs may communicate with each other, and the longitudinal bores in the cutting section when arranged as a pair may communicate with each other, and, if desired, the longitudinal bores in the shank section may communicate with the longitudinal bores in the cutting section. The establishment of the communication of the longitudinal bores in the respective section with each other or of the longitudinal bores of the sections with each other may be effected by a depression which is provided in the cutting and/or shank section and which prior to the welding together of said cutting and shank sections are filled with filling material. A plurality of longitudinal bores of the raw tool may also be connected with each other by a transverse bore which latter will also serve as entrance opening for the fluid conveying passages. The supply of fluid may, however, also be effected through transversely extending feeding bores.

According to a preferred embodiment of the above mentioned method according to the invention, filling material will during the hardening in an ordinary hardening salt bath be melted while the shank section extends upwardly whereby it is made possible to employ the heretofore known devices also for the method of the present invention.

According to a modification of the above mentioned method, it is suggested providing the raw tool with at least one longitudinal bore which will extend at least through that section which later forms the cutting section, and filling said longitudinal bore with a filling material the melting temperature of which is higher than the deforming temperature of the material for the raw tool, and subsequently heating at least the cutting section of the raw tool to deforming temperature and producing the tool cross section and, if desired, also the twisting of the flutes and thereby the twisting of the longitudinal bore in a chipless manner by rolling or extrusion molding, whereupon the filling material prior or after the hardening is by means of a suitable solvent removed from the raw tool, and thereafter the tool is finish machined in customary manner.

In all instances it is advantageous to employ a short raw tool with a diameter which is large relative to the diameter of the finished tool and with correspondingly short longitudinal bores of large diameter.

The invention will now be described in connection with the production of a drill with two or more fluid conveying passages which are arranged near the free surfaces behind the phases and preferably have a drop-shaped cross-section with the point thereof pointing to the longitudinal axis of the tool. This cross-sectional shape of the fluid conveying passages yields a particularly favorable cooling of the cutting edges of the drill.

Referring now to the drawings in detail, there will first be described one possibility of realizing the method according to the invention.

For purposes of making a solid steel tool with one or more inner fluid conveying passages, the raw tool 1 is provided with one or more longitudinal bores 3. These bores 3 are subsequently filled with a filling material 5 the melting temperature of which is higher than the deforming temperature and lower than the hardening temperature of the material of which the raw tool is made. Such filling material may for instance be brass or copper.

If for purposes of saving the high grade material of the cutting section, a raw tool is composed of two sections welded together, these two sections are in conformity with FIGS. 2 and 3 provided with corresponding bores. The cutting section 2a of the two-sectional raw tire 2 is provided with two longitudinal bores 4 which, in the particular embodiment shown in FIG. 3, are designed as blind bores. These two longitudinal bores 4 are interconnected by a cavity 7 which is provided in that end face of the cutting section 2a which later will be welded to the shank section 2b. The shank section 2b is provided with one or more bores 6 which serve for feeding fluid to the fluid conveying passages. According to the illustrated embodiment, the shank section 2b is provided with a bore 6 extending in the longitudinal direction of the shank section 2b and extending from one end to the other end thereof. Bore 6 is so arranged that, after the sections 2a and 2b have been welded together, it will lead into the cavity 7 and in this way will be in communication with the longitudinal bores 4.

The cavity 7 may, of course, also be provided in the shank section 2b instead of in the cutting section 2a, or both sections 2a and 2b may be provided with a cavity 7. The longitudinal bores 4 and the bores 6 as well as the cavities 7 will subsequently be filled with filling material 5 whereupon the cutting section 2a is welded to the shank section 2b. To this end, advantageously the well known butt welding method is used and the burr formed is subsequently removed. Although the melting temperature of the filling material 5 is lower than the welding temperature, the filling material 5 will prevent a clogging up or filling of the bores 3 and 6 and of the cavity 7.

If a raw tool composed of a shank section and a cutting section is to be provided with one or more bores extending from one end to the other end, the bores may also be provided after the cutting section and shank section have been welded together. Said bores may, under certain circumstances, also extend through the welding area.

The raw tools 1 and 2 (FIGS. 4 or 5) provided with the filled longitudinal bores 3 or 4 are now heated over the length of their cutting section 1a, 2a to deforming temperature. This temperature is dependent on the material selected for the cutting section 1a, 2a but at any rate will be lower than the melting temperature of the filling material 5.

After the deforming temperature has been obtained, the cutting section 1a, 2a of the raw tool 1 or 2 is provided with the desired flutes which may either be longitudinally extending straight grooves or helical grooves. The helical grooves, for instance of a drill, can be produced either by a rolling operation by means of a set of profile rollers or profile jaws or by extrusion molding by means of a matrix 10 having a corresponding profile. FIG. 6 illustrates the manufacture of a drill in an extrusion press known per se with a matrix 10.

During the rolling operation, the front openings of the bores in the raw tools are preferably closed in order to prevent the filling material 5 from escaping, whereas during the extrusion process, the front openings may be open while the rear openings should be closed. To this end, the openings of the bores may either be welded closed or may be provided with closure members. On the other hand, it is also possible, as indicated in FIGS. 3–5, to produce the bores from the very start as blind bores.

When producing the flutes in an extrusion press diagrammatically illustrated in FIG. 6, those openings 3a, 6a of the raw tools 1, 2 which are adjacent the shank are kept closed by means of the advancing member which, according to FIG. 6, is formed by a pressure ram 11.

When the tools are produced in one working operation with helical flutes, according to the method of the present invention, simultaneously with the shaping of the cross-section and of the desired twist of the flutes, a twisting of the longitudinal bores 3, 4 is effected as shown in FIG. 6.

Subsequently to the shaping of the cutting section 1a, 2a, the raw tools 1 and 2 are hardened. The hardening step may be preceded in a manner known per se by a preheating process. According to a preferred embodiment of the method according to the invention, the raw tools 1, 2 are hardened in an ordinary hardening salt bath with the cutting section 1a, 2a pointing downwardly. In this connection, the raw tool 1, 2 is heated from below to hardening temperature. The filling material 5 which is present in the longitudinal bores 3 or 4 closed at the lower end is, starting at the lowest point, liquified whereby the pressure in the bores 3 or 4 and 6 of the raw tools 1 or 2 increases. This pressure increases in conformity with the quantity of the melting filling material 5 and does so until that portion of the filling material 5 will become soft which closes the openings 3a, 6a at the side of the shank section. As soon as this portion of the material has become deformable, the inner pressure of the liquified filling material 5 will expel from the openings 3a, 6a adjacent the shank section those parts which acted as stoppers.

When the hardening of the raw tools 1, 2 is, in conformity with the invention, effected in a hardening salt bath, the expelled filling material 5 burns without impurifying the hardening salt bath to any material extent. The bores of the raw tools 1 and 2 which serve as fluid conveying passages are subsequently completely freed from filling material 5 whereby it is impossible, in view of the arrangement according to the present invention, that the liquid of the hardening bath enters said bores because the tip of the tool is still closed. This end with the closed longitudinal bores 3, 4 is now separated from the cutting section 1a, 2a, and the tip thus being formed and the cutting section 1a, 2a are finished machined in customary manner.

It is, of course, also possible according to the method of the present invention to cool the raw tools after the rolling or extrusion process, furthermore to cut off the tip of the tool, and only then to melt the filling material in the bores which melting process may be effected in a hardening bath or in a hardening furnace. In this instance, following the cooling off, also transverse bores may be provided in the raw tool which later will serve for feeding fluid or merely for establishing communication between individual longitudinal bores, in which instance the ends of the transverse bores have to be closed in any suitable manner.

Instead of the above described method which comprises different possibilities of realizing the individual method steps, the tool provided with inner fluid conveying passages may also be produced by filling the raw tool, after one or more longitudinal bores have been provided, with a filling material the melting temperature of which is higher than the deforming temperature of the material of the raw tool but not necessarily lower than the hardening temperature. In this instance, following the shaping of the tool cross-section by rolling or extrusion molding, the filling material may, prior or after the hardening operation, be removed from the raw tool by a suitable solvent, and the tool can then be finish machined in customary manner.

In all instances it is advantageous to employ a relatively short raw tool with a very large diameter in respect to the finished tool, because there are obtained correspondingly short longitudinal bores with large diameter which can be bored or drilled in a simpler manner and can also be filled with filling material in an easier way.

Figure 7:
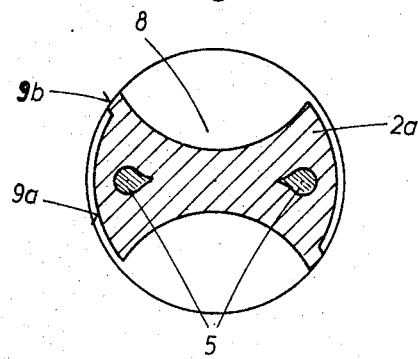
FIG. 7 is a cross-section taken along the line VII—VII of FIG. 6 through the extrusion molded cutting section of the raw tool.

FIG. 7 represents a cross-section through a drill made in conformity with the method according to the present invention. As will be seen from FIG. 7, the fluid conveying passages located near the free surfaces 9a behind the phases 9b have a drop-shaped cross-section with the point thereof pointing to the longitudinal axis of the drill. The fluid conveying passages follow the twist of the grooves 8. The drop-like shape of the cross-section of the passages is favorable not only for the strength of the tool but at the same time also brings about a uniform cooling of the main and of the transverse cutting edges.

There will now be set forth a specific example for the production of a drill having a diameter of 20 millimeters. This drill is composed of a cutting section made of high speed steel S 6–5–2 and a shank section made of HK 70, both sections in their starting condition having a diameter of approximately 23 millimeters. The cutting section is provided with two longitudinal bores each having a diameter of 5 millimeters. These bores lead into a depression or cavity having a depth of from 3 to 10 millimeters. The deformation of the cutting section is effected at approximately 900° C. As filling material there there is employed brass with a melting temperature slightly above 900° C.

As will be evident from the above, the method according to the present invention makes it possible to produce tools which are provided with inner fluid conveying passages and in which the desired cross-sectional shape and, if desired, the twist of the flutes of the cutting section are produced in one operation without chip removing in conformity with heretofore known methods and while employing heretofore known devices. The additional provision of the longitudinal bores in the raw tools does not cause any difficulties in view of the short starting length of the raw tool sections, and also the filling of the short longitudinal bores and, if desired, also the filling of the cavity with the respective filling material can easily be effected.

It is, of course, to be understood that the present invention is, by no means, limited to the particular example set forth above. For instance it is not necessary that the raw tools are round and have a larger diameter than the finished tool. The deforming temperature may, depending on the material and the respective tool to be produced, be between 500 and 1200° C. so that corresponding filling material may be employed which, by no means, has to be brass, copper or a metal, but may also be a non-metal as, for example, glass. In the last-mentioned instance the filling material, i.e. glass, may be removed from the respective bores or passage means by means of hydrofluoric acid. Furthermore, the invention is not limited to the manufacture of drills since, for instance, also reamers, broaches and tap drills or the like may be produced according to the present invention. In this instance, frequently one longitudinal bore is sufficient. Finally, it is also possible when producing drills or similar tools, to provide more than two longitudinal bores.

What I claim is:

1. A method of producing from the solid body of a raw tool a cutting tool with interior fluid conveying passage means, which includes the steps of: providing the solid body with at least one longitudinal bore in at least that portion of the raw tool which is intended to become the cutting section of the finished tool, filling the said bore with a filling material the melting temperature of which is higher than the deforming temperature of the material of said raw tool, heating to deforming temperature that portion of the raw tool which is intended to become the cutting section of the finished tool, deforming the solid body of said tool to change its cross sectional shape to approximate final cross-section of the finished tool, heating the tool to melt said filling material in and to remove it from said passage means, and finish machining the thus produced tool.

2. A method according to claim 1, in which said deforming includes the step of simultaneously lengthening and twisting said solid body with said filling material in said passage means when the raw tool has been heated to deforming temperature.

3. A method according to claim 2, in which said deforming includes the step of rolling the solid body to twist and lengthen the tool simultaneously.

4. A method according to claim 2, in which said deforming includes the step of extrusion molding the solid body to twist and lengthen the tool simultaneously.

5. A method according to claim 1, in which the heating to melt the material includes the step of heating to a temperature to harden said tool and to remove said filling material from said passage means only during said hardening step.

6. A method according to claim 1, which includes keeping said passage means closed at least at one end thereof during deformation of the solid body of the raw tool to its approximately final cross-section.

7. A method according to claim 5, which includes the step of melting the filling material during the hardening operation in an ordinary hardening salt bath while so holding the tool to assure that portion thereof points upwardly which is intended to become the shank portion of the tool.

8. A method according to claim 1, which includes the steps of: producing the tool in two sections, viz. a cutting section and a shank section, welding said sections together and providing said sections with at least one longitudinal passage means extending in alignment through both of said sections.

9. A method according to claim 8, which includes the step of providing a cavity in at least one of said sections adjacent the other section, and filling said aligned bores prior to welding said sections together.

10. A method according to claim 1, in which the passage means in that section of the tool which is intended to become the cutting section are in the form of at least one blind hole having its closed end located in spaced relationship to that end of the tool which is intended to become the tip of the cutting section, and removing material from said last-mentioned tip end so that in finished condition of said cutting section said passage means will lead to the outside of said end.

11. A method of producing spiral drills and similar tools having twist grooves and having internally located fluid conveying passage means, which includes the steps of: providing the raw tool with at least one longitudinal bore in at least that portion of the raw tool which subsequently becomes the cutting section of the finished tool, filling the said bore with a filling material having a melting temperature higher than the deforming temperature of the material of the raw tool and lower than the hardness tempering temperature of the material of the raw tool, subsequently heating to deforming temperature at least that portion of the raw tool which is to become the cutting section of the finished tool, deforming the raw tool to change its cross sectional shape to produce the tool cross section and simultaneously twisting the raw tool during deformation, heating to tempering temperature to melt the filling material out of the raw tool during tempering thereof and removing the filling material from the longitudinal bore, and finishing the raw tool customarily especially by way of tip formation and cutting section grinding.

12. A method according to claim 11, wherein deforming the raw tool also deforms the longitudinal bore into at least a generally triangular cross section having an acute angled corner directed toward the center of the tool to increase the resultant cooling surface for better cooling.

References Cited

UNITED STATES PATENTS

| | | | |
|---|---|---|---|
| 1,751,758 | 3/1930 | Ray | 29—423UX |
| 1,943,560 | 1/1934 | Squires | 29—423UX |
| 2,841,866 | 7/1958 | Schilling | 29—423UX |

FOREIGN PATENTS

| | | | |
|---|---|---|---|
| 962,884 | 12/1949 | France | 76—108 |

BERNARD STICKNEY, Primary Examiner

U.S. Cl. X.R.

29—423; 77—68